(12) United States Patent
Week

(10) Patent No.: US 6,449,711 B1
(45) Date of Patent: Sep. 10, 2002

(54) METHOD, APPARATUS, AND ARTICLE OF MANUFACTURE FOR DEVELOPING AND EXECUTING DATA FLOW PROGRAMS

(75) Inventor: Jeremy Week, Bloomfield, CO (US)

(73) Assignee: Sun Microsystems, Inc., San Jose, CA (US)

(*) Notice: Subject to any disclaimer, the term of this patent is extended or adjusted under 35 U.S.C. 154(b) by 0 days.

(21) Appl. No.: 09/244,137

(22) Filed: Feb. 4, 1999

(51) Int. Cl.[7] .......................... G06F 9/305; G06F 3/45; G06F 9/52; G06F 11/36

(52) U.S. Cl. .................... 712/223; 712/245; 712/227; 712/201; 717/131; 717/132; 717/133; 717/154; 717/155; 717/156; 714/38

(58) Field of Search ................... 714/738, 38, 27; 704/256, 9, 10, 257, 255, 232, 253, 1, 2; 712/220, 17, 227, 228, 217, 201, 206, 215, 234; 707/23, 15, 512, 532; 705/10; 706/60, 145, 20, 11, 59, 13, 17, 57, 46, 12, 45, 50, 56; 716/4, 43, 245; 711/167, 111, 5; 717/9, 152, 124, 143, 146, 154, 131, 132, 133, 155, 156; 710/107, 307

(56) References Cited

U.S. PATENT DOCUMENTS

| | | | |
|---|---|---|---|
| 5,136,705 A | 8/1992 | Stubbs et al. ................. 714/27 |
| 5,185,694 A | 2/1993 | Edenfield et al. ........... 710/107 |
| 5,317,740 A | 5/1994 | Sites ........................... 395/700 |
| 5,493,675 A | 2/1996 | Gaiman, Jr. et al. ............. 717/9 |
| 5,650,948 A | 7/1997 | Gafter ............................ 716/3 |
| 5,778,233 A | 7/1998 | Besaw et al. ................ 395/709 |
| 5,867,649 A | * 2/1999 | Larson ........................ 709/201 |
| 6,073,098 A | * 6/2000 | Buchsbaum et al. ........ 704/255 |

* cited by examiner

Primary Examiner—Daniel H. Pan
(74) Attorney, Agent, or Firm—Thelen Reid & Priest LLP

(57) ABSTRACT

Methods, systems, and articles of manufacture consistent with the present invention provide a development tool that enables computer programmers to design and develop a data flow program for execution in a multiprocessor computer system. The tool displays an interface that enables the programmer to define a region divided into multiple blocks, wherein each block is formed of a set of values associated with a function, and to define sets of the blocks, each block in a set having a state reflected by a designated portion of the program that when executed transforms the values forming the block based on the function. The interface also records any dependencies among the blocks, each dependency indicating a relationship between two blocks and requiring the portion of the program associated with a first block of the relationship to be executed before the portion of the program associated with a second block of the relationship. After program development, blocks are selected for execution of the corresponding, designated portions of the program based on the recorded dependencies.

25 Claims, 12 Drawing Sheets

METHOD, APPARATUS, AND ARTICLE OF MANUFACTURE FOR DEVELOPING AND EXECUTING DATA FLOW PROGRAMS

RELATED APPLICATION

This application is related to U.S. application Ser. No. 09/244,136, entitled "User Interface for Developing and Executing Data Flow Programs and Methods, Apparatus, and Articles of Manufacture for optimizing the Execution of Data Flow Programs" by inventor Bradley Lewis, filed on Feb. 4, 1999.

BACKGROUND OF THE INVENTION

A. Field of the Invention

This invention relates to the field of multiprocessor computer systems and, more particularly, to data driven processing of computer programs using a multiprocessor computer system.

B. Description of the Related Art

Multiprocessor computer systems include two or more processors that may be employed to execute the various instructions of a computer program. A particular set of instructions may be performed by one processor while other processors perform unrelated sets of instructions.

Fast computer systems, like multiprocessor computer systems, have stimulated the rapid growth of a new way of performing scientific research. The broad classical branches of theoretical science and experimental science have been joined by computational science. Computational scientists simulate on supercomputers phenomena too complex to be reliably predicted by theory and too dangerous or expensive to be reproduced in a laboratory. Successes in computational science have caused demand for supercomputing resources to rise sharply in recent years.

During this time, multiprocessor computer systems, also referred to as "parallel computers," have evolved from experimental contraptions in laboratories to become the everyday tools of computational scientists who need the ultimate in computing resources in order to solve their problems. Several factors have stimulated this evolution. It is not only that the speed of light and the effectiveness of heat dissipation impose physical limits on the speed of a single processor. It is also that the cost of advanced single-processor computers increases more rapidly than their power. And price/performance ratios become more favorable if the required computational power can be found from existing resources instead of purchased. This factor has caused many sites to use existing workstation networks, originally purchased to do modest computational chores, as "SCAN"s (SuperComputers At Night) by utilizing the workstation network as a parallel computer. This scheme has proven so successful, and the cost effectiveness of individual workstations has increased so rapidly, that networks of workstations have been purchased to be dedicated to parallel jobs that used to run on more expensive supercomputers. Thus, considerations of both peak performance and price/performance are pushing large-scale computing in the direction of parallelism. Despite these advances, parallel computing has not yet achieved wide-spread adoption.

The biggest obstacle to the adoption of parallel computing and its benefits in economy and power is the problem of inadequate software. The developer of a program implementing a parallel algorithm for an important computational science problem may find the current software environment to be more of an obstruction than smoothing the path to use of the very capable, cost-effective hardware available. This is because computer programmers generally follow a "control flow" model when developing programs, including programs for execution by multiprocessor computers systems. According to this model, the computer executes a program's instructions sequentially (i.e., in a series from the first instruction to the last instruction) as controlled by a program counter. Although this approach tends to simplify the program development process, it is inherently slow.

For example, when the program counter reaches a particular instruction in a program that requires the result of another instruction or set of instructions, the particular instruction is said to be "dependent" on the result and the processor cannot execute that instruction until the result is available. Moreover, executing programs developed under the control flow model on multiprocessing computer systems results in a significant waste of resources because of these dependencies. For example, a first processor executing one set of instructions in the control flow program may have to wait for some time until a second processor completes execution of another set of instructions, the result of which is required by the first processor to perform its set of instructions. This wait-time translates into an unacceptable waste of computing resources in that at least one of the processors in this two-processor configuration is idle the whole time while the program is running.

To better exploit parallelism in a program some scientists have suggested use of a "data flow" model in place of the control flow model. The basic concept of the data flow model is to enable the execution of an instruction whenever its required operands become available, and thus, no program counters are needed in data-driven computations. Instruction initiation depends on data availability, independent of the physical location of an instruction in the program. In other words, instructions in a program are not ordered. The execution simply follows the data dependency constraints.

Programs for data-driven computations can be represented by data flow graphs. An example data flow graph is illustrated in FIG. 1 for the calculation of the following expression:

$$z=(x+y)* 2$$

When, for example, x is 5 and y is 3, the result z is 16. As shown graphical in the figure, z is dependent on the result of the sum and x and y. The data flow graph is a directed acyclic graph ("DAG") whose nodes correspond to operators and arcs are pointers for forwarding data. The graph demonstrates sequencing constraints (i.e., constraints with data dependencies) among instructions.

For example, in a conventional computer, program analysis is often done (i) when a program is compiled to yield better resource utilization and code optimization, and (ii) at run time to reveal concurrent arithmetic logic activities for higher system throughput. For instance, consider the following sequence of instructions:

1. P=X+Y
2. Q=P/Y
3. R=X*P
4. S=R-Q
5. T=R*P
6. U=S/T

The following five computational sequences of these instructions are permissible to guarantee the integrity of the result when executing the instructions on a serial computing system (e.g., a uniprocessor system):

1,2,3,4,5,6
1,3,2,5,4,6
1,3,5,2,4,6
1,2,3,5,4,6
1,3,2,4,5,6

For example, the first instruction must be executed first, but the second or third instruction can be executed second, because the result of the first instruction is required for either the second or third instruction, but neither the second nor the third requires the result of the other. The remainder of each sequence follows this simple rule-no instruction can be run until its operands (or inputs) are available.

In a multiprocessor computer system with two processors, however, it is possible to perform the six operations in four steps (instead of six) with the first processor computing step 1, followed by both processors simultaneously computing steps 2 and 3, followed by both processors simultaneously steps 4 and 5, and finally either processor computing step 6. This is an obvious improvement over the uniprocessor approach because execution time is reduced.

Using data flow as a method of parallelization will thus extract the maximum amount of parallelism from a system. Most source code, however, is in a control form, which is difficult and clumsy to parallelize efficiently for all types of problems.

It is therefore desirable to provide a facility for developers to more easily develop data flow programs and to convert existing control flow programs into data flow programs for execution on multiprocessor computer systems.

SUMMARY OF THE INVENTION

Methods, systems, and articles of manufacture consistent with the present invention overcome the shortcomings of existing systems by enabling developers to easily convert control flow programs into a data flow approach and to develop new programs according to the data flow model. According to one aspect of the present invention, such methods, systems, and articles of manufacture, as embodied and broadly described herein, this program development process includes defining a memory region and dividing it into multiple blocks, each block defining a set of values associated with a function. Sets of the blocks are defined, each block in a set having a state reflected by a designated portion of the program that when executed transforms the values forming the block based on the function. Additionally, any dependencies among the blocks are specified by the user. Each dependency indicates a relationship between two blocks and requires the portion of the program associated with one of the two blocks to be executed before the portion of the program associated with the other block.

In accordance with another aspect of the present invention, methods, systems, and articles of manufacture, as embodied and broadly described herein, execute a data flow program in a multiprocessor computer system. Execution of the program involves selecting information in a queue identifying a block formed of a set of values associated with a function of the program and determining whether execution of a portion of the program associated with the selected block is dependent on a result of the execution of a portion of the program associated with another block. The portion of the program associated with the selected block is then executed when it is determined that execution of the portion of the program associated with the selected block is not dependent on a result of the execution of a portion of the program associated with the other block. This selection and determination is repeated when it is determined that execution of the portion of the program associated with the selected block is dependent on a result of the execution of a portion of the program associated with the other block.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

Figure 1:
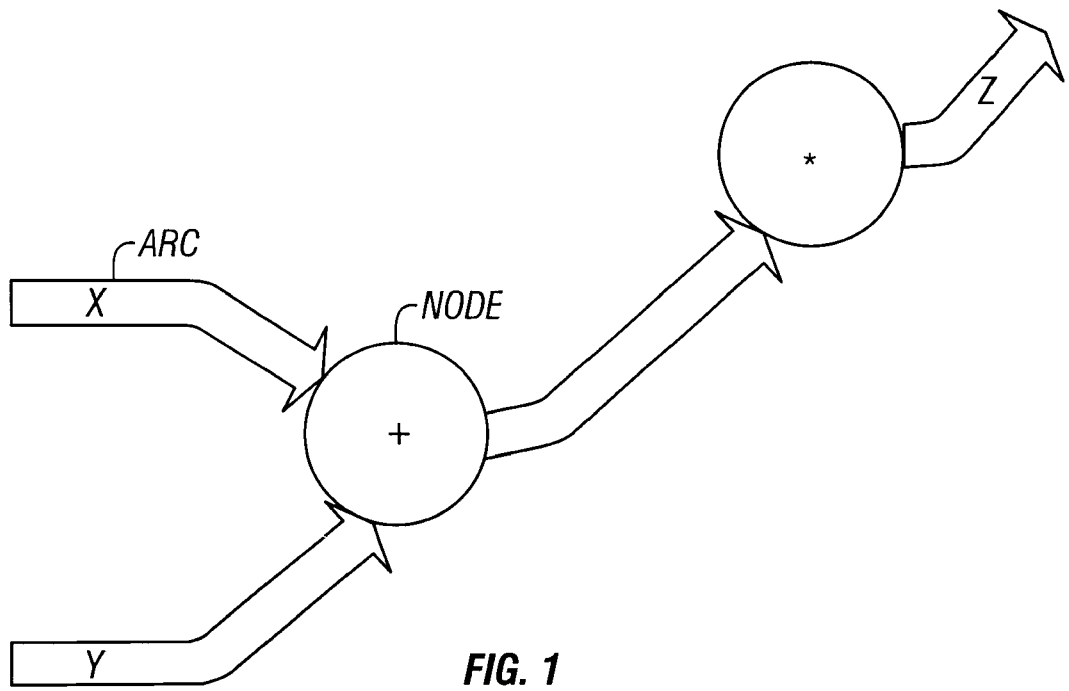
FIG. 1 depicts an example data flow graph for the calculation of a particular expression.
Figure 2A:
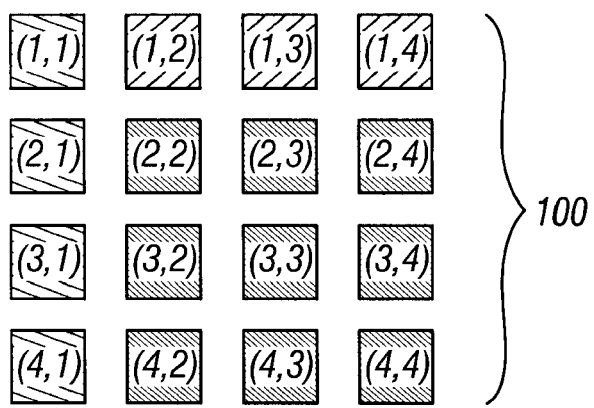
FIG. 2 depicts a block diagram illustrating an example of a memory region defined in a manner consistent with the present invention.
Figure 2B:
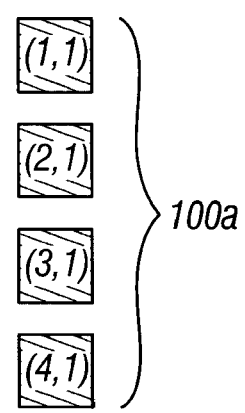
Figure 2C:
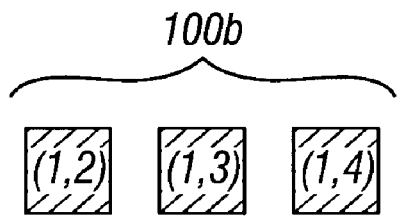
Figure 2D:
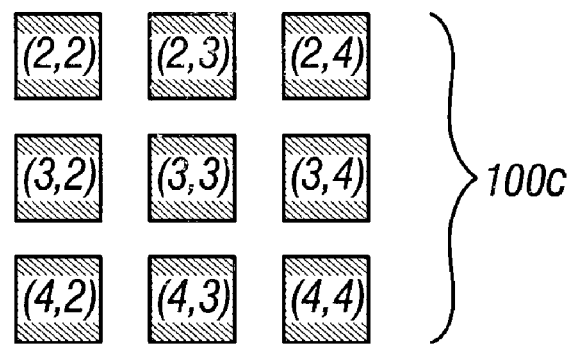

Reference will now be made in detail to an implementation consistent with the present invention as illustrated in the accompanying drawings. Wherever possible, the same reference numbers will be used throughout the drawings and the following description to refer to the same or like parts.

Introduction

Methods, systems, and articles of manufacture consistent with the present invention enable developers to convert control flow programs into data flow programs and to develop new programs according to the data flow model. Such methods, systems, and articles of manufacture may utilize a development tool, including a computer-human interface, to design and develop the data flow programs.

Data flow programs developed in accordance with the principles of the present invention are executed on a multiprocessor computer system using a data flow model. The interface may be operated on a different data processing system from that used for program execution. Alternatively, the interface may be operated on the same system used for program execution.

One characteristic of the data flow model in accordance with the present invention is that operations can be performed in parallel on blocks of a memory region. A block consists of a set of data, such as an array or matrix of values or other information. Together, multiple blocks form a memory region.

The data flow program development tool provides an interface that enables a developer to define a memory region containing data associated with a system. In this context, the term "system" refers to a physical, mathematical, or computational problem, such as the structural analysis of a building, the flow of fluid through a pipe, etc. Typically, such complex systems require a great deal of processing to solve many equations and the result of one set of equations is dependent on the result of another set of equations. For example, fluid flowing though a pipe is slowed by friction from the interior of the pipe. The friction directly affects the speed of the fluid touching the interior of the pipe (defined by a first set of equations) and indirectly affects other fluid in the pipe not touching the interior (defined perhaps by the same equations but dependent on the result of the first set of equations). Thus, the effects of friction caused by the interior of the pipe are different for fluid flowing in the pipe depending on where in the fluid is in the pipe at any given instance.

After defining the region, the developer then divides the region into blocks, and for each block, the developer specifies the program code to be executed on the values within the block as well as any dependency between the block and other blocks in the region. Blocks with the same program code are said to share the same "state." They can generally be executed in parallel because they do not depend on one another for results. In the fluid flow example, blocks associated with fluid flowing next to the interior of the pipe would share the same state (and therefore have the same program code for execution) but this state (and code) would be different from the state (and code) of fluid that is not touching the interior but is next to the fluid that is. Moving inwardly into the pipe and the state (and code) of each block associated with fluid in the pipe changes to reflect the dependencies in a similar manner.

Dependencies are reflected in links between each of the dependent blocks and the blocks from which they depend. A block is dependent on another block when the first block requires the result of the second block for the first block to perform properly within the system. These relationships may be viewed graphically through a directed acyclic graph ("DAG"). Associated with each node in the graph are program code and data determined by the block.

The blocks are then queued for processing in a multiprocessor computer system. Actually, the blocks themselves are not put in the queue. Rather, information identifying each block such as a pointer is placed in the queue. The blocks are queued or organized in the queue in a particular manner and the thread(s) executing the data flow program can select the appropriate block for execution of its corresponding program code at any given point in time during the data flow program execution. In one implementation, the blocks are queued according to the dependency information associated with each block.

The developer may designate the number of threads available to process the blocks. Each thread maintains a program counter and temporary memory, as needed, to perform the program code associated with the blocks. For example, the developer may designate one thread per processor. Alternative configurations are also possible in accordance with the principles of the present invention.

Each thread, in turn, selects a block from the queue and executes the program code designated by the developer for that block. As long as there are blocks in the queue, the threads, when available, select them and execute their program code. Additionally, queued blocks are selected for execution in a manner that reflects each block's dependency information. When an available thread selects a queued block for execution, the thread first examines the block's dependency information (i.e., any links to other blocks) and if the blocks from which the selected block depends have completed execution, then the thread can proceed to execute the program code for the selected block. Otherwise, the thread may enter a wait state until it can begin executing the program code for the selected block. Alternatively, the thread may select the next available block in the queue, based on any priority if appropriate, and examine that block to determine its status with respect to any blocks upon which it depends (i.e., have all blocks from which it depends completed execution so that the program code of the selected block can be executed safely). This process continues until the threads have completed executing the program code associated with all blocks in the queue.

The following description includes details on the design and development of data flow programs followed by aspects of the execution phase.

Defining a Data Flow Program Using Regions and Blocks

Figures 1, 3A:
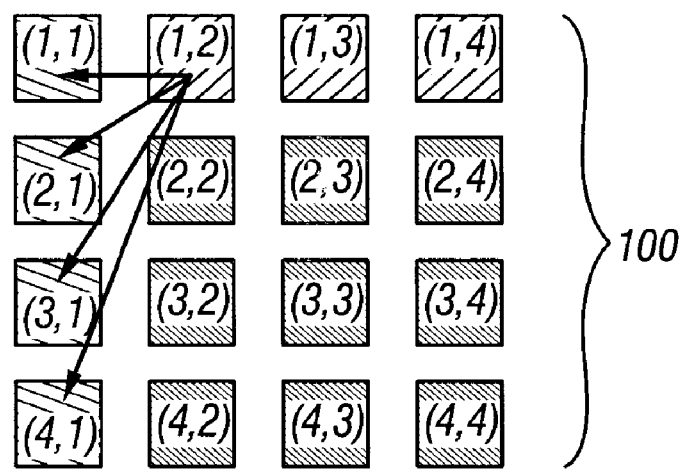
FIGS. 3A and 3B depict block diagrams illustrating an example of dependency relationships among the blocks of the memory region illustrated in FIG. 2.
Figures 2, 3A:
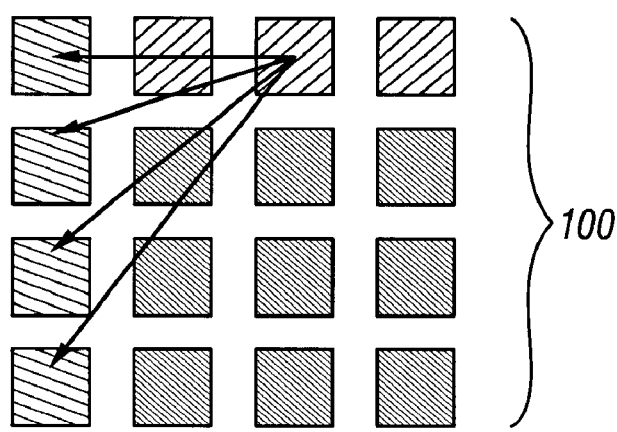

At the beginning of the design and development process, a developer specifies a memory region and divides the region into blocks. This may be done graphically using an interface provided with the development tool. FIG. 2 shows an example of a memory region 100 that contains sixteen blocks arranged in a four-by-four matrix, with each block identified by a row number and column number. For example, the block in the upper left corner of memory region 100 is labeled (1,1) indicating that it is located in the first row and the first column, and the block in the lower right hand corner of region 100 is labeled (4,4) indicating that it is located in the lower right corner. All of the remaining fourteen blocks follow the same labeling convention. As explained, each block contains a data set, such as a matrix or array of values or information, to be processed in accordance with certain program code.

After defining the memory region and dividing it into blocks, the developer specifies a state of each block. As explained, the state of a block corresponds to the program code that the developer assigns to that block, meaning that the developer intends to have the multiprocessor computer system operate on the data in the block using the specified program code. The interface provides the developer with a window or other facility to provide the program code for a block. The development tool associates the code with its block.

In the example region 100, the group of blocks 100*a* labeled (1,1), (2,1), (3,1), and (4,1) share the same state, the group of blocks 100*b* labeled (1,2), (1,3), and (1,4) share the same state, and the group of blocks 100*c* labeled (2,2), (2,3), (2,4), (3,2), (3,3), (3,4), (4,2), (4,3), and (4,4) share the same state. The three different states are shown in FIG. 2 by different shading (or fill) for the blocks in each group.

Although the region 100 and its blocks are shown as being uniform in size, in practice a memory region and blocks may have different shapes and sizes. For example, memory region 100 consists of sixteen blocks in a four-by-four matrix and, although not specified in the figure, each block may have an eight-by-eight matrix. Alternatively, and depending on the application, the memory region may consist of a four-by-three matrix of blocks and each block may consist of a three-by-two matrix of data.

Figures 3, 3A:
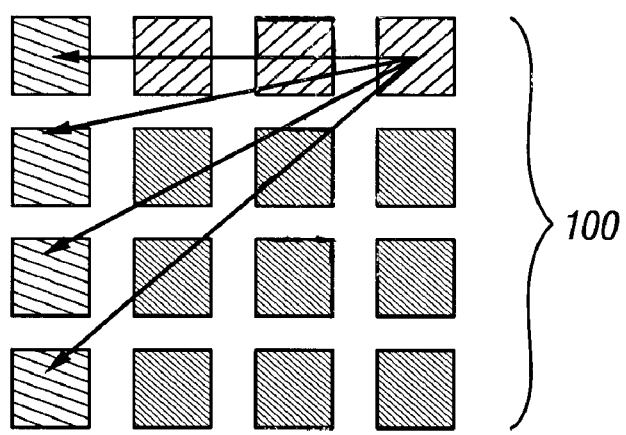
Figure 3B:
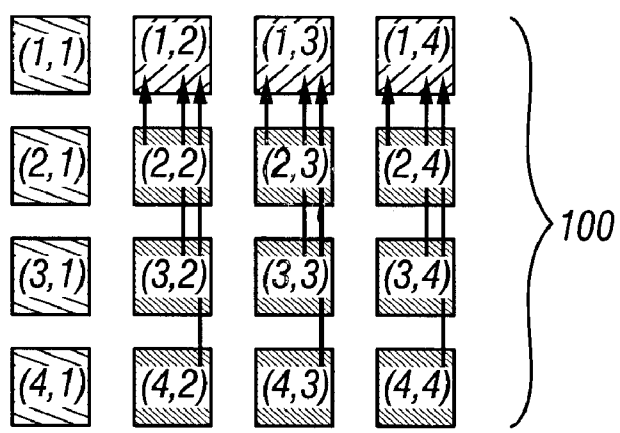

Next, the developer specifies any dependency relationships among the blocks. Again, a dependency relationship is defined as a relationship in which one block is dependent upon the result or final state of another block during program execution. In other words, one block has to be processed before the second, dependent block can be processed. FIGS. 3A and 3B illustrate a number of examples of dependency relationships using region 100 of FIG. 2. As shown in FIG. 3A, each of the blocks labeled (1,2), (1,3), and (1,4) are dependent on the blocks labeled (1,1), (2,1), (3,1), and (4,1). This means that all of the blocks labeled (1,1), (2,1), (3,1), and (4,1) must be processed before any of the blocks (1,2), (1,3), and (1,4).

Similarly, FIG. 3B illustrates dependencies among each of the blocks labeled (1,2), (1,3), and (1,4) and the blocks labeled (2,2), (2,3), (2,4), (3,2), (3,3), (3,4), (4,2), (4,3), and (4,4). As shown, the block labeled (1,2) must be processed before the blocks in the same column labeled (2,2), (2,3), (2,4); the block labeled (1,3) must be processed before the blocks in the same column labeled (3,2), (3,3), (3,4); and the block labeled (1,4) must be processed before the blocks in the same column labeled (4,2), (4,3), and (4,4). The figures simply illustrate one example of a dependency configuration for memory region 100; other configurations may be selected by the developer.

Figure 4:
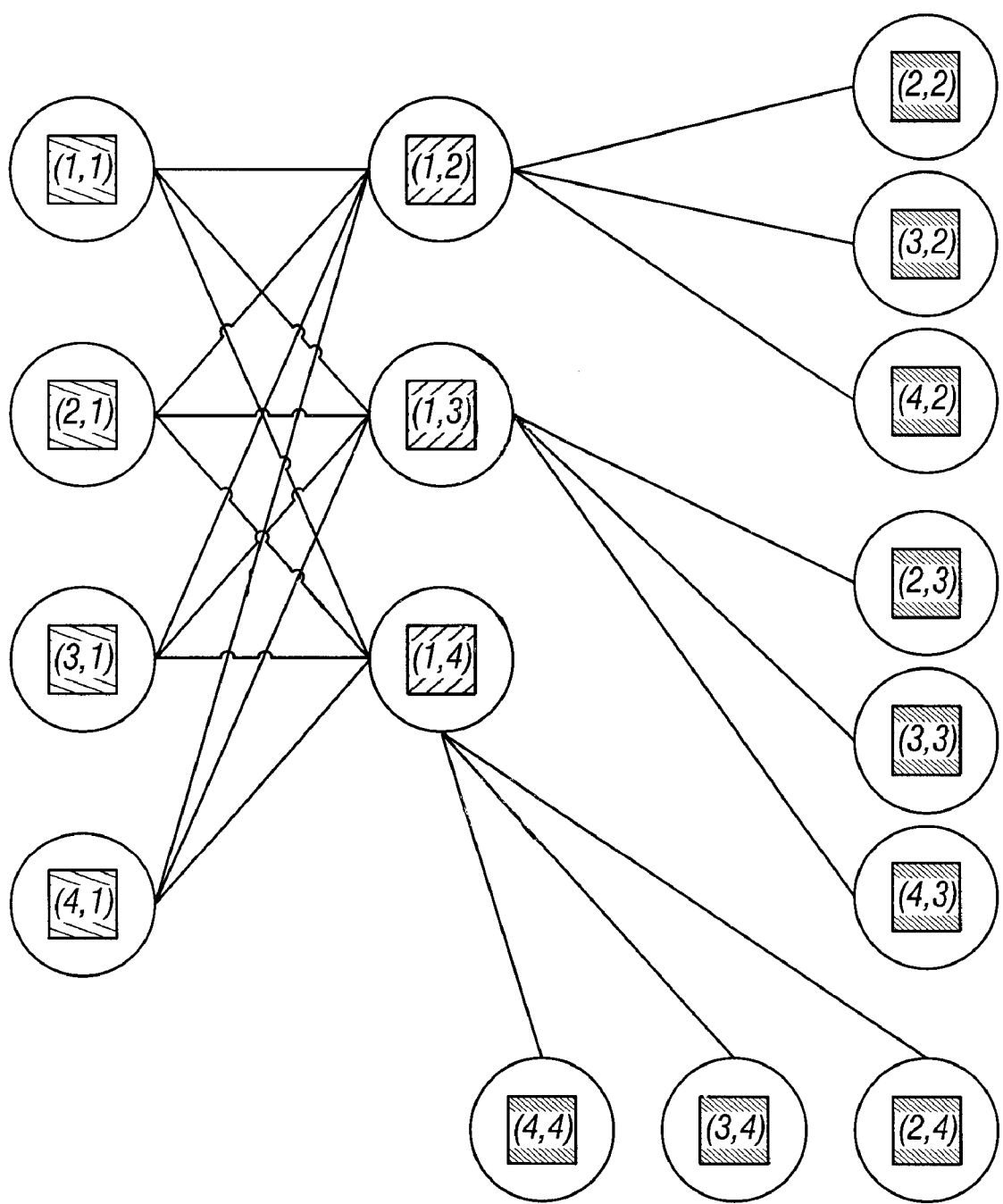
FIG. 4 depicts an example of a directed acyclic graph illustrating the dependency relationships corresponding to FIGS. 3A and 3B.

To complete the view of dependency relationships, it is useful to see them graphically which can also be done using the user interface. FIG. 4 is a DAG illustrating the dependency relationships shown in FIGS. 3a and 3b. The DAG of FIG. 4 illustrates graphically that the output of all of the blocks sharing the first state are required for processing by each of the blocks sharing the second state. In turn, each of the blocks sharing the second state must be processed before each of the three groups of three blocks that share the third state are processed. Such a graph may be used to order the blocks for processing in accordance with the principles of the present invention (discussed below).

Figure 5:
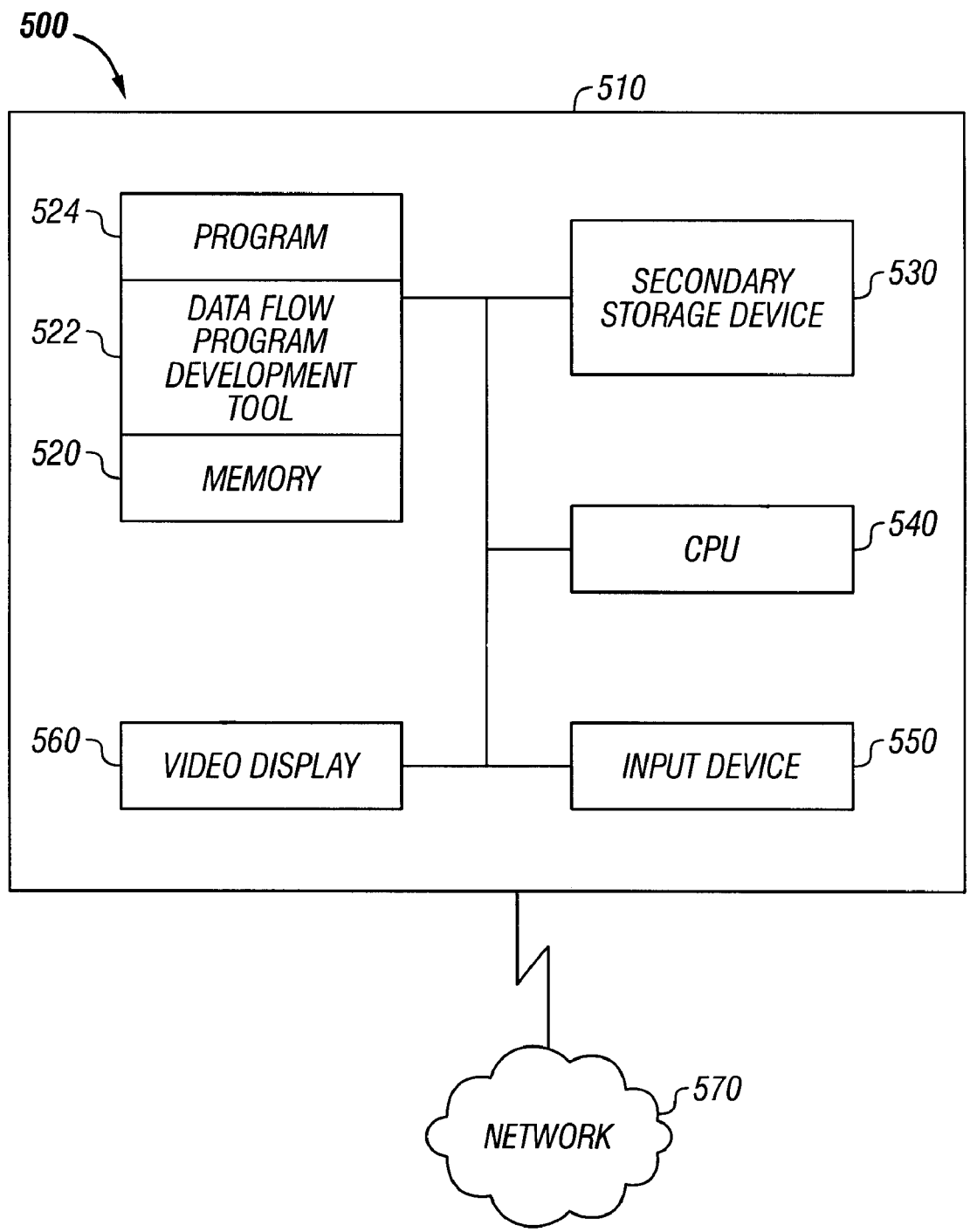
FIG. 5 depicts a block diagram of an exemplary data processing system with which the invention may be implemented.

Data Flow Program Development Tool
  Computer Architecture
  FIG. 5 depicts an exemplary data processing system 500 suitable for practicing methods and implementing systems consistent with the present invention. Data processing system 500 includes a computer system 510 connected to a network 570, such as a Local Area Network, Wide Area Network, or the Internet.

Computer system 510 contains a main memory 520, a secondary storage device 530, a central processing unit (CPU) 540, an input device 550, and a video display 560. Main memory 520 contains a data flow program development tool 522 and program 524. Data flow program development tool 522 provides the interface for designing and developing data flow programs, including programs that utilize control flow program code. Using display 560 the tool enables developers to design memory regions, such as region 100 of FIG. 2, and divide the regions into blocks with corresponding states. The tool further enables developers to write program code to operate on each of the blocks using a multiprocessor computer system (see FIG. 7).

Program 524 represents a data flow program designed in accordance with the present invention, for example, using tool 522. Program 524 consists of the information specifying a memory region, the blocks of the region, the program code associated with each block, and any dependency relationships between the blocks.

Although aspects of one implementation are depicted as being stored in memory 520, one skilled in the art will appreciate that all or part of systems and methods consistent with the present invention may be stored on or read from other computer-readable media, such as secondary storage devices, like hard disks, floppy disks, and CD-ROM; a carrier wave received from a network such as the Internet; or other forms of ROM or RAM. Finally, although specific components of data processing system 500 have been described, one skilled in the art will appreciate that a data processing system suitable for use with methods and systems consistent with the present invention may contain additional or different components.

Figure 6:
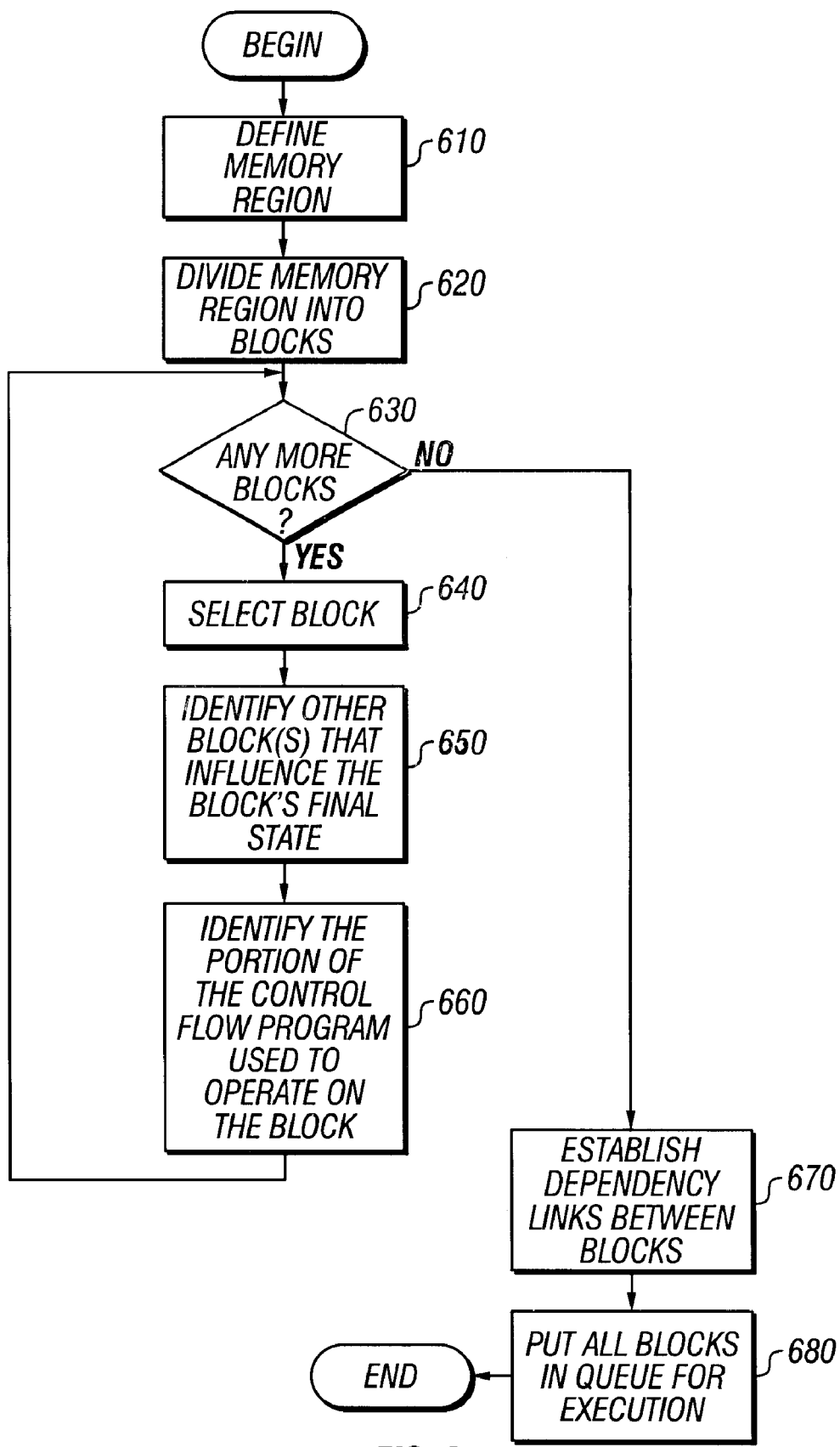
FIG. 6 depicts a flow chart of the operations performed by a data flow program development tool consistent with the present invention.

Process
FIG. 6 is a flow chart of the process 600 performed by developers to write programs using the data flow model. This process may be performed by tool 522 in a manner consistent with the principles of the present invention. As explained, tool 522 provides an environment, including a user interface and related functionality, for software developers to write programs using the data flow model.

After a developer initiates execution of tool 522, it displays the various views necessary for the developer to write a data flow program. First, the tool displays a view with which the developer defines a memory region (step 610). Using tool 522, the developer then divides the region into blocks (step 620).

As long as there are blocks in a region to be processed (step 630), the developer selects a block (step 640), identifies any other block(s) that influence the selected block's final state (in other words, block(s) upon which the selected block is dependent) (step 650), and specifies the program code for each block, for example, a portion of an existing control flow program (step 660). Although this description involves converting an existing control flow program for operation in a multiprocessor computer system using a data flow organization, those skilled in the art will recognize that the tool 522 may also be used to develop new data flow programs for execution on a multiprocessor computer system.

After all of the blocks have been processed (steps 640 to 660), the developer establishes the dependency relationships among the blocks by graphically linking them together (step 670). The tool 522 uses the graphical information to generate and store data reflecting the links. The blocks are then logically queued for processing in a multiprocessor computer system (step 680). The tool 522 uses the dependency/link information to queue the blocks in manner that reflects an appropriate order for processing. For example, any block(s) upon which a particular block is dependent may be placed in the queue before that particular block. For the example of FIGS. 2–4, the blocks may be queued in the manner shown in FIG. 7 with the blocks sharing the first state, i.e., (1,1), (2,1), (3,1), and (4,1), queued before the blocks with the second state, ie., (1,2), (1,3), and (1,4), and followed by the blocks sharing the third state, i.e., (2,2), (2,3), (2,4), (3,2), (3,3), (3,4), (4,2), (4,3), and (4,4).

Figure 8:
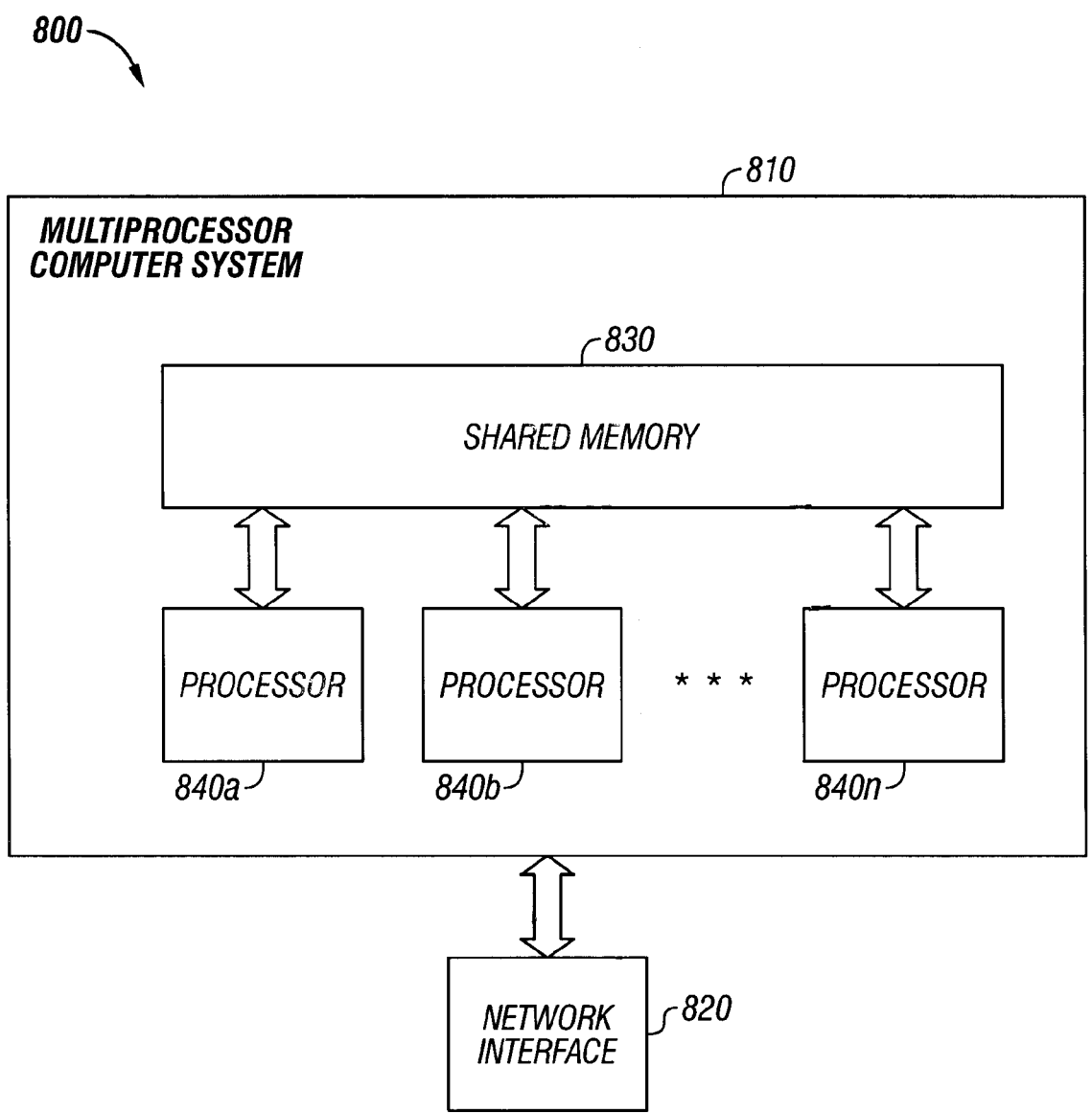
FIG. 8 depicts a block diagram of an exemplary multi-processor computer system suitable for use with methods and systems consistent with the present.

Multiprocessor Program Execution
As explained, in accordance with the present invention a data flow program is executed in a multiprocessor computer system. There are many configurations for such a multiprocessor computer system, one of which is illustrated in FIG. 8. For example, in a tightly coupled configuration, the multiple processors of a system may all be located in the same physical box. In an alternative, loosely coupled arrangement the system may be formed by multiple computers in a network, each computer having a separate processor.

Multiprocessor Computer System
As shown in FIG. 8, a multiprocessor computer system 810 is connected to a network interface 820, which enables a developer to transfer the data flow program from the development tool environment (e.g., FIG. 5) for execution in multiprocessor computer system 810. Alternatively, the data flow program development process in accordance with the principles of the present invention may be performed on system 810, which is also used for program execution. This alternative approach eliminates the need to transfer the program from a system used for development to a separate system used for program execution.

Multiprocessor computer system 810 comprises a single, shared memory 830 and multiple processors 840a, 840b, ... 840n. The number and type of processors is not critical to execution of the data flow program developed in accordance with the present invention. For example, an HPC Server with a multiple processor configuration may be used. The HPC Server is a product of Sun Microsystems, Inc. Processes execute independently on each of the processors and share memory 830. A process in this context may be a thread controlling execution of program code associated with a block of a data flow program developed using tool 522.

Process

Figure 9:
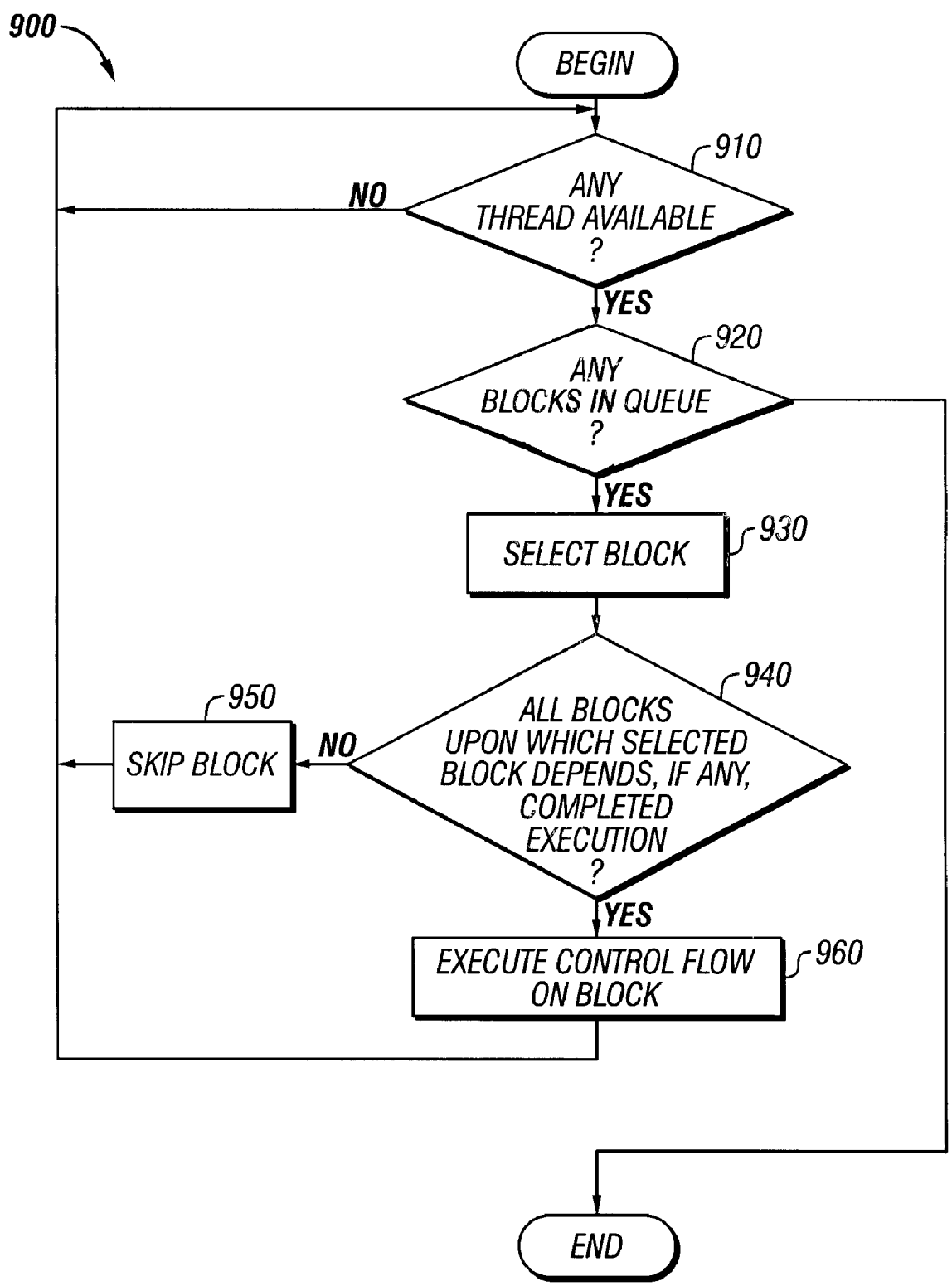
FIG. 9 depicts a flow chart of the operations performed during execution of a data flow program in accordance with the present invention.

The operation of a data flow program in accordance with the present invention will now be described with reference to process 900 of FIG. 9. Multiple threads are used to process the various components of a data flow program. Those skilled in the art will recognize that the number of threads is not important; the developer may specify any number, for example, one thread per processor, or the system may determine the number of threads based on the number of available processors and an analysis of the data flow program.

If a thread is available to process a block in accordance with its specified program code (step 910), the thread determines whether there are any blocks in the queue (step 920). If so, the available thread selects a block from the queue for processing (step 930). Typically, the blocks are selected from the queue based on the order in which they were placed in the queue. If, however, a thread determines that a selected block is dependent upon the execution of program code with respect to other block(s) that has/have not been executed (step 940), the thread skips the selected block (step 950). Otherwise, any block dependencies have been satisfied (step 940) and the thread uses an assigned processor to execute the program code associated with the block (step 960). Once the thread(s) processing a data flow program have dequeued all of the blocks in a queue awaiting processing (step 920), the process ends.

Figure 7:
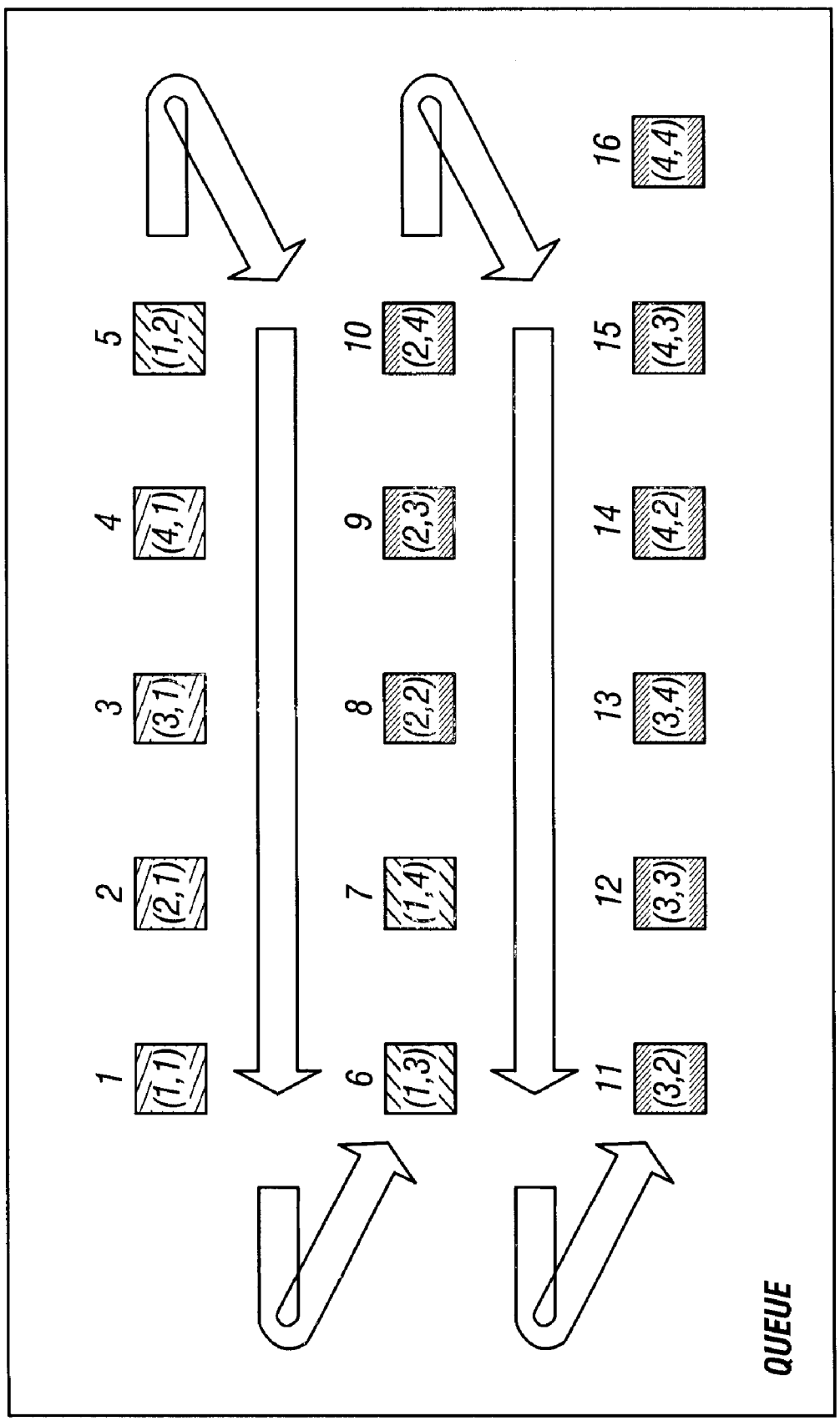
FIG. 7 depicts an example of a queue reflecting an order for execution of a data flow program in accordance with the present invention.
Figure 10A:
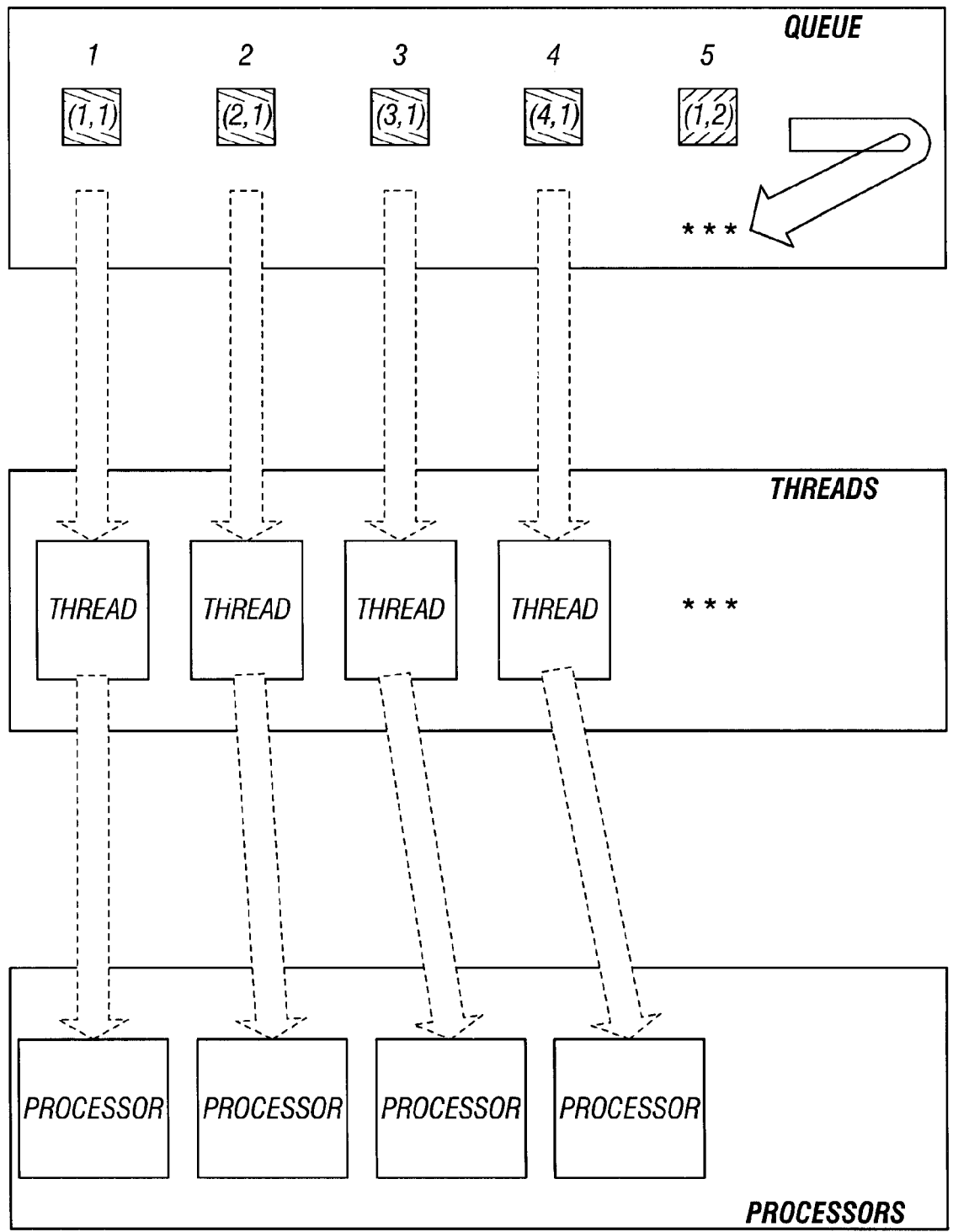
FIGS. 10A, 10B, and 10C depict block diagrams used to explain an execution cycle of a data flow program in accordance with the present invention.
Figure 10B:
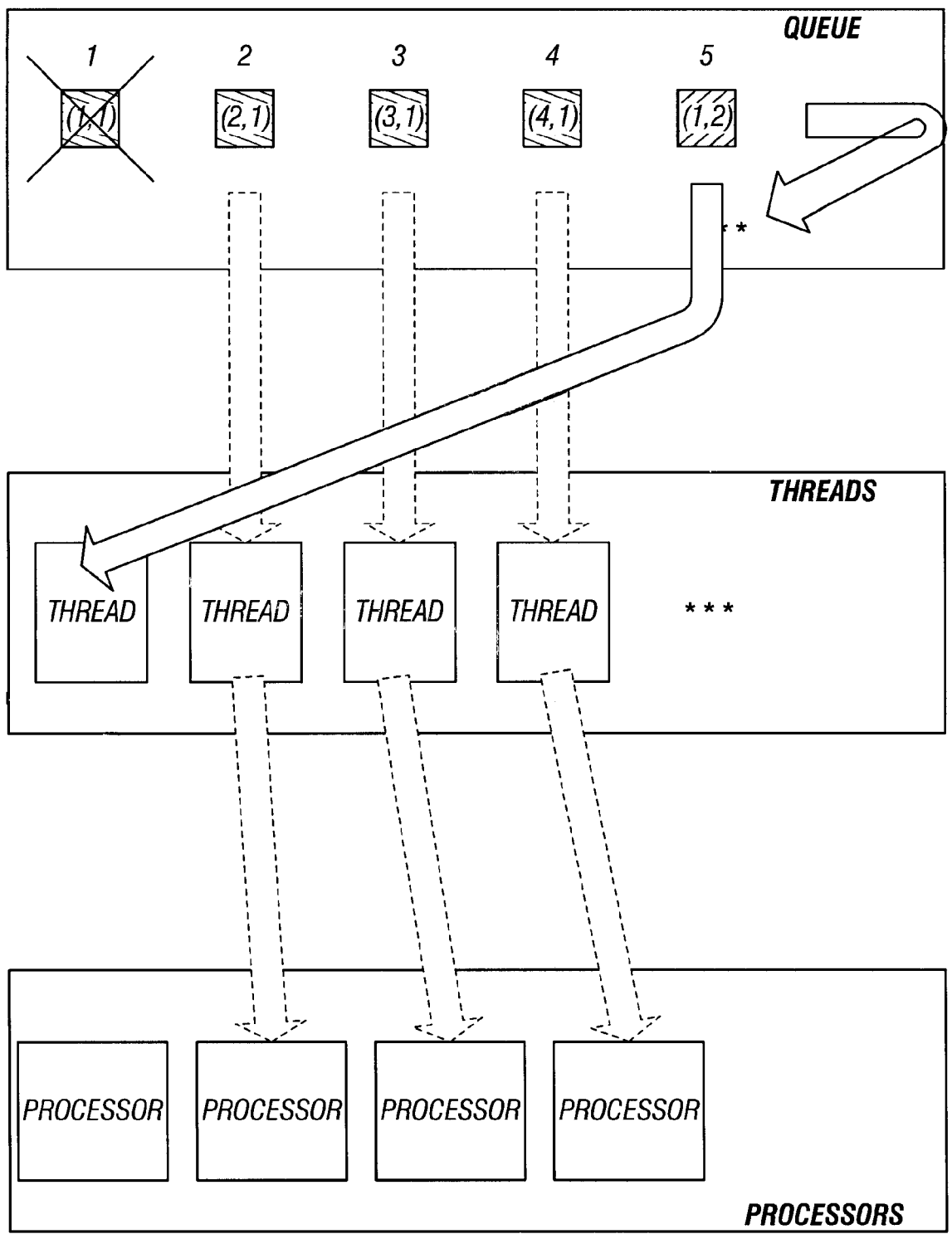
Figure 10C:
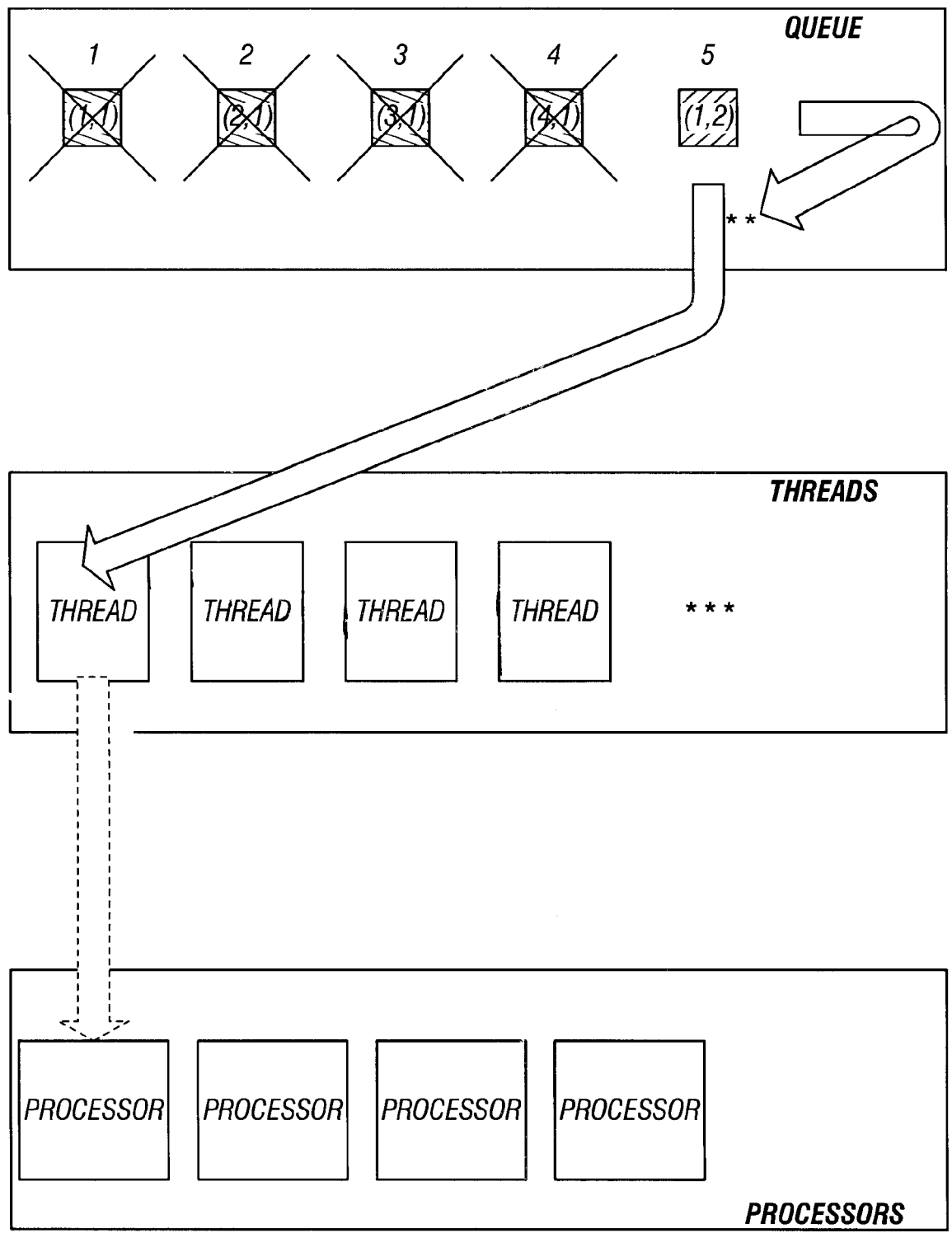

For purposes of illustrating the data flow program execution in accordance with process 900, FIGS. 10a–c illustrate a portion of the queue of FIG. 7, including the first five blocks of region 100 queued for processing. As shown in FIG. 10a, each thread processes a selected block using one of the processors. In this example, there are four threads and four processors. When a thread completes processing, as shown for example in FIG. 10b with one of the threads completing program execution of the block labeled (1,1), the thread attempts to execute the next available thread in the queue, in this case, the block labeled (1,2). However, the block labeled (1,2) is dependent upon the final state of other blocks still being executed, namely, blocks (2,1), (3,1), and (4,1). Once execution of the program code for all of these blocks has completed, as shown in FIG. 10c, a thread can continue processing with block (1,2). Those skilled in the art will recognize that, as opposed to remaining idle and, thus, not using computing resources efficiently, a thread may skip processing blocks in the queue and continue to process other queued blocks depending upon the dependency relationships associated with each block in the queue. Also, although FIG. 10 shows four threads and four processors, more or fewer threads or processors may be used depending upon the particular system configuration.

Conclusion

Methods, systems, and articles of manufacture consistent with the present invention thus enable developer to easily develop data flow programs and to convert existing control flow programs according to the data flow model. By permitting developers to define memory regions and divide them into blocks with corresponding states (each related to particular control flow program instructions), the interface facilitates the development of a data flow program for execution in a multiprocessor environment. Although components of the program utilize the control flow programming method, the program as a whole is designed using a data flow approach. Additionally, each block contains a set of data, meaning that the program code associated with each block does not necessarily operate on scalars or single data items. This makes the present approach more useful for data-intensive programming systems that require significant data processing in which components can be easily processed in parallel on a multiprocessor computer system.

Also, methods consistent with the present invention are applicable to all programs for execution in a multiprocessor system regardless of the computer programming language. For example, Fortran 77 is a programming language commonly used to develop programs for execution by multiprocessor computer systems.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. The invention may be implemented with both object-oriented and non-object-oriented programming systems. The scope of the invention is defined by the claims and their equivalents.

What is claimed is:

1. A method for executing a control flow program based on a data flow model in a multiprocessor computer system, comprising:

receiving instructions defining a region divided into multiple blocks, wherein each block is formed of a set of values associated with a function;

receiving instructions defining sets of the blocks, each block in a set having a state reflected by a designated portion of the control flow program that when executed transforms the values forming the block based on the function;

storing any dependencies among the blocks, each dependency indicating a relationship between two blocks and requiring the portion of the control flow program associated with a first block of the relationship to be executed before the portion of the control flow program associated with a second block of the relationship; and selecting the multiple blocks for execution of each corresponding, designated portion of the control flow program based on the stored dependencies.

2. The method of claim 1, wherein storing any dependencies among the blocks, comprises:

assigning a link between the two blocks.

3. The method of claim 1, wherein storing any dependencies among the blocks, comprises:

determining that the second block depends on a result of the execution of the portion of the control flow program associated with the first block.

4. The method of claim 1, wherein selecting blocks for execution comprises:
receiving an instruction designating a number of threads available to execute the designated portion of the control flow program associated with each block.

5. The method of claim 1, wherein selecting blocks for execution comprises:
forming a queue containing information identifying the blocks.

6. The method of claim 5, wherein forming a queue comprises:
ordering the information identifying the blocks in the queue based on the stored dependencies such that information identifying each block that depends on a result of the execution of the designated portion of the control flow program associated with another block is ordered in the queue after the information identifying the block from which it depends.

7. A method for executing a program in a multiprocessor computer system, comprising:
receiving instructions defining a region divided into multiple blocks, wherein each block is formed of a set of values associated with a function;
receiving instructions defining sets of the blocks, each block in a set having a state reflected by a designated portion of the program that when executed transforms the values forming the block based on the function;
storing any dependencies among the blocks, each dependency indicating a relationship between two blocks and requiring the portion of the program associated with a first block of a relationship to be executed before the portion of the program associated with a second block of the relationship; and
selecting the multiple blocks for execution of each corresponding, designated portion of the program based on the stored dependencies.

8. A method for executing a program in a multiprocessor computer system, comprising:
selecting information in a queue identifying a block formed of a set of values associated with a function;
determining whether a final state of the selected block is dependent on a final state of another block by considering an indicator associated with the selected block; and
executing a portion of the program associated with the selected block when it is determined that the final state of the selected block is not dependent a final state of the other block.

9. A method for executing a program in a multiprocessor computer system, comprising:
selecting information in a queue identifying a block formed of a set of values associated with a function;
determining whether a final state of the selected block is dependent on a final state of another block by considering whether execution of a portion of the program associated with the selected block is dependent on a result of the execution of a portion of the program associated with another block; and
executing the portion of the program associated with the selected block when it is determined that the final state of the selected block is not dependent a final state of the other block.

10. A method for executing a program in a multiprocessor computer system, comprising:
selecting information in a queue identifying a block formed of a set of values associated with a function;
determining whether a final state of the selected block is dependent on a final state of another block; and
implementing a portion of the program associated with the selected block when it is determined that execution of the portion of the program associated with the selected block is not dependent on a result of the execution of a portion of the program associated with the other block.

11. An apparatus for executing a program, comprising:
means for receiving instructions defining a region divided into multiple blocks, wherein each block is formed of a set of values associated with a function;
means for receiving instructions defining sets of the blocks, each block in a set having a state reflected by a designated portion of the program that when executed transforms the values forming the block based on the function;
means for storing any dependencies among the blocks, each dependency indicating a relationship between two blocks and requiring the portion of the program associated with a first block of a relationship to be executed before the portion of the program associated with a second block of the relationship; and
means for selecting the multiple blocks for execution of each corresponding, designated portions of the program based on the stored dependencies.

12. A computer-readable medium containing instructions for controlling a data processing system to perform a method, the method comprising:
receiving instructions defining a region divided into multiple blocks, wherein each block is formed of a set of values associated with a function;
receiving instructions defining sets of the blocks, each block in a set having a state reflected by a designated portion of the control flow program that when executed transforms the values forming the block based on the function;
storing any dependencies among the blocks, each dependency indicating a relationship between two blocks and requiring the portion of the control flow program associated with a first block of the relationship to be executed before the portion of the control flow program associated with a second block of the relationship; and
selecting the multiple blocks for execution of each corresponding, designated portion of the control flow program based on the stored dependencies.

13. The computer-readable medium of claim 12 wherein storing any dependencies among the blocks, comprises:
assigning a link between the two blocks.

14. The computer-readable medium of claim 12, wherein storing any dependencies among the blocks, comprises:
determining that the second block depends on a result of the execution of the portion of the control flow program associated with the first block.

15. The computer-readable medium of claim 12, wherein selecting blocks for execution comprises:
receiving an instruction designating a number of threads available to execute the designated portion of the control flow program associated with each block.

16. The computer-readable medium of claim 12, wherein selecting blocks for execution comprises:

forming a queue containing information identifying the blocks.

17. The computer-readable medium of claim 16, wherein forming a queue comprises:

ordering the information identifying the blocks in the queue based on the stored dependencies such that information identifying each block that depends on a result of the execution of the designated portion of the control flow program associated with another block is ordered in the queue after the information identifying the block from which it depends.

18. A computer-readable medium containing instructions for controlling a data processing system to perform a method for developing a program, the method comprising:

receiving instructions defining a region divided into multiple blocks, wherein each block is formed of a set of values associated with a function;

receiving instructions defining sets of the blocks, each block in a set having a state reflected by a designated portion of the program that when executed transforms the values forming the block based on the function; and storing any dependencies among the blocks, each dependency indicating a relationship between two blocks and requiring the portion of the program associated with a first block of a relationship to be executed before the portion of the program associated with a second block of the relationship.

19. The computer-readable medium of claim 18, wherein the program is executed on a multiprocessor computer system, the method comprising:

selecting the multiple blocks for execution of each corresponding, designated portion of the program based on the stored dependencies.

20. A computer-readable medium containing instructions for controlling a data processing system to perform a method for executing a program in a multiprocessor computer system, the method comprising:

selecting information in a queue identifying a block formed of a set of values associated with a function;

determining whether a final state of the selected block is dependent on a final state of another block by considering an indicator associated with the selected block; and executing a portion of the program associated with the selected block when it is determined that the final state of the selected block is not dependent a final state of the other block.

21. A computer-readable medium containing instructions for controlling a data processing system to perform a method for executing a program in a multiprocessor computer system, the method comprising:

selecting information in a queue identifying a block formed of a set of values associated with a function;

determining whether a final state of the selected block is dependent on a final state of another block by considering whether execution of a portion of the program associated with the selected block is dependent on a result of the execution of a portion of the program associated with another block; and executing the portion of the program associated with the selected block when it is determined that the final state of the selected block is not dependent a final state of the other block.

22. A computer-readable medium containing instructions for controlling a data processing system to perform a method for executing a program in a multiprocessor computer system, the method comprising:

selecting information in a queue identifying a block formed of a set of values associated with a function;

determining whether a final state of the selected block is dependent on a final state of another block; and implementing a portion of the program associated with the selected block when it is determined that execution of the portion of the program associated with the selected block is not dependent on a result of the execution of a portion of the program associated with the other block.

23. A system for executing a data flow program, comprising:

a memory having a program characterized by memory region information, including block information reflecting multiple blocks that define a memory region, wherein each block is formed of a set of values associated with a function and has a state reflected by a designated portion of the program that when executed transforms the values forming the block based on the function, and dependency information reflecting any dependencies among the blocks, each dependency indicating a relationship between two blocks and requiring the portion of the program associated with a first block of the relationship to be executed before the portion of the program associated with a second block of the relationship; and at least one processor configured to execute the program.

24. A computer-implemented method for developing a program, comprising:

defining a region divided into multiple blocks, wherein each block is formed of a set of values associated with a function;

defining sets of the blocks, each block in a set having a state reflected by a designated portion of the program that when executed transforms the values forming the block based on the function; and storing any dependencies among the blocks, each dependency indicating a relationship between two blocks and requiring the portion of the program associated with a first block of the relationship to be executed before the portion of the program associated with a second block of the relationship.

25. A computer-implemented method for converting a control flow program into a data flow program for execution by a multiprocessor computer system, comprising:

defining a region divided into multiple blocks, wherein each block is formed of a set of values associated with a function;

defining sets of the blocks, each block in a set having a state reflected by a designated portion of the control flow program that when executed transforms the values forming the block based on the function; and storing any dependencies among the blocks, each dependency indicating a relationship between two blocks and requiring the portion of the control flow program associated with a first block of the relationship to be executed before the portion of the control flow program associated with a second block of the relationship.

* * * * *